US009959346B2

(12) United States Patent
Hefeeda et al.

(10) Patent No.: US 9,959,346 B2
(45) Date of Patent: May 1, 2018

(54) SYSTEM AND METHOD TO STORE VIDEO FINGERPRINTS ON DISTRIBUTED NODES IN CLOUD SYSTEMS

(71) Applicant: Qatar Foundation, Doha (QA)

(72) Inventors: Mohamed Hefeeda, Doha (QA); Ahmed Abdelsadek Ahmed, Doha (QA)

(73) Assignee: Qatar Foundation, Doha (QA)

( * ) Notice: Subject to any disclaimer, the term of this patent is extended or adjusted under 35 U.S.C. 154(b) by 709 days.

(21) Appl. No.: 14/399,690

(22) PCT Filed: Sep. 24, 2012

(86) PCT No.: PCT/EP2012/068780
§ 371 (c)(1),
(2) Date: Nov. 7, 2014

(87) PCT Pub. No.: WO2013/185852
PCT Pub. Date: Dec. 19, 2013

(65) Prior Publication Data
US 2015/0120750 A1 Apr. 30, 2015

(30) Foreign Application Priority Data

Jun. 15, 2012 (GB) .................................. 1210702.5

(51) Int. Cl.
*G06F 17/30* (2006.01)
(52) U.S. Cl.
CPC .. *G06F 17/30858* (2013.01); *G06F 17/30094* (2013.01); *G06F 17/30324* (2013.01);
(Continued)
(58) Field of Classification Search
CPC ............. G06F 17/30094; G06F 17/301; G06F 17/30312; G06F 17/30946; G06F 17/30336
See application file for complete search history.

(56) References Cited

U.S. PATENT DOCUMENTS 5,734,791 A * 3/1998 Acero .................. G10L 19/038
704/200
6,760,737 B2 * 7/2004 Jiang .................. H03H 17/0263
708/202
(Continued)

FOREIGN PATENT DOCUMENTS

WO WO 2013/185852 A1 12/2013

OTHER PUBLICATIONS

Beis, Jeffrey S., and David G. Lowe. "Shape indexing using approximate nearest-neighbour search in high-dimensional spaces." Computer Vision and Pattern Recognition, 1997. Proceedings., 1997 IEEE Computer Society Conference on. IEEE, 1997.*
Katayama, Norio, and Shin'ichi Satoh. "The SR-tree: An index structure for high-dimensional nearest neighbor queries." ACM Sigmod Record 26.2 (1997): 369-380.*
(Continued)

*Primary Examiner* — Nan Hutton
(74) *Attorney, Agent, or Firm* — Martin & Ferraro, LLP (57) ABSTRACT

A method to design, implement and create distributed indexes for storing and comparing fingerprints of videos is presented. The method effectively utilizes cloud computing platforms that offer varying amounts of computing resources. The method enables the distributed index to scale to large numbers of data points and the distributed index is robust to failures within the computing resources maintaining the index. The method minimizes the memory required to maintain the distributed index and reduces the I/O operations needed to process operations performed on the index. The method improves the efficiency of the index to process queries.

32 Claims, 2 Drawing Sheets

(52) U.S. Cl.
CPC .. *G06F 17/30327* (2013.01); *G06F 17/30333* (2013.01); *G06F 17/30781* (2013.01); *G06F 17/30961* (2013.01); *G06F 17/30994* (2013.01)

(56) References Cited

U.S. PATENT DOCUMENTS

| | | | |
|---|---|---|---|
| 7,602,982 B2 * | 10/2009 | Budge | G06T 9/008 382/239 |
| 8,001,109 B2 * | 8/2011 | Lohman | G06F 17/30445 707/713 |
| 8,171,030 B2 | 5/2012 | Pereira et al. | |
| 8,300,881 B2 | 10/2012 | Chen et al. | |
| 8,996,501 B2 * | 3/2015 | Pfeifle | G06F 17/30542 707/716 |
| 2003/0236787 A1 * | 12/2003 | Burges | G06F 17/30327 |
| 2008/0178302 A1 | 7/2008 | Brock et al. | |
| 2010/0161614 A1 * | 6/2010 | Choi | G06F 17/30979 707/741 |
| 2010/0318759 A1 | 12/2010 | Hamilton et al. | |

OTHER PUBLICATIONS

J. Bentley, "Multidimensional Binary Search Trees used for Associative Searching," Communications of the ACM, vol. 18, No. 9, pp. 509-517, 1975.

J. Dean and S. Ghemawat, "MapReduce: Simplified Data Processing on Large Clusters," Communications of the ACM, vol. 51, No. 1, pp. 107-113, 2008.

International Search Report and Written Opinion of WO 2013/185852, International Application No. PCT/EP2012/068780, daed Feb. 25, 2013, 13 pages.

Silpa-Anan and R. Hartley, "Optimized KD Trees for Fast Image Descriptor Matching," in Proc. of IEEE Conference on Computer Vision and Pattern Recognition, pp. 1-8, Anchorage, AL, Jun. 2008.

Gao et al., "A Kd-Tree Based Dynamic Indexing Scheme for Video Retrieval and Geometry Matching," Computer Communications and Networks, 2008, ICCCN '08, Proceedings of 17th International Conference on, 20080803 IEEE, Piscataway, NJ, USA, pp. 1-5, Aug. 2008, 5 pgs.

Liao et al, "Multi-dimensional Index on Hadoop Distributed File System," Networking, Architecture and Storage (NAS), 2010 IEEE Fifth International conference on, Jul. 15, 2010 IEEE, Piscataway, NJ, USA, pp. 240-249, Jul. 2010, 10 pgs.

* cited by examiner

SYSTEM AND METHOD TO STORE VIDEO FINGERPRINTS ON DISTRIBUTED NODES IN CLOUD SYSTEMS

This is a National Phase Application under 35 USC 371 of PCT/EP2012/068780 filed Sep. 24, 2012 (published on Dec. 19, 2013 as WO 2013/185852), which claims priority to Great Britain Application No. 1210702.5 filed Jun. 15, 2012, all of which are incorporated herein by reference.

DESCRIPTION OF INVENTION

This invention relates to distributed indexes for video processing applications on cloud systems and more particularly to a system and method to store video fingerprints on distributed nodes in cloud systems.

BACKGROUND

Content-based video applications, such as copy detection and online video search, require the processing of large-scale and high dimensional data points. These data points represent many features extracted from videos. Given the substantial number of videos made available online and the increasing visual richness and complexities of online videos, processing such large amounts of data points has become a major challenge.

The present invention seeks to provide a mechanism for improving the handling and processing of large-scale and high dimensional data points within a video processing environment. In general terms the present invention relates to the processing of videos in a cloud computing environment.

Multidimensional trees for video processing are disclosed in C. Silpa-Anan and R. Hartley, Optimized KD Trees for Fast Image Descriptor Matching, In Proc. of IEEE Conference on Computer Vision and Pattern Recognition, pp. 1-8, Anchorage, Al., June 2008 and in J. Bentley, Multidimensional Binary Search Trees used for Associative Searching, *Communications of the ACM*, vol 18, No 9, pp. 509-517, 1975.

US2011/0064262 discloses attempts to protect 3D videos (videos consist of a base view and an enhancement view) by identifying regions in base and/or enhancement pictures that are not referenced by other pictures in the compressed 3D video. Then, these regions are watermarked and transmitted. Receivers of water-marked videos extract and verify the embedded watermarks.

US2008/0313140 discloses a method and apparatus for multi-dimensional content search and video identification which utilises multidimensional databases and indexes to search different structures such as videos. To do this, a compact hash of multidimensional vector signatures is used as the traversal index. For video search applications, global and local signatures around key points are used as discriminative information of the videos. To find matches, a likelihood score based on frame similarity is computed between the frames of a query video and original videos. Then, a correlation between the query video and original videos is generated by using a change in signatures of each sequence of frames in the query video and original videos.

US2008/0178302 discloses the use of video fingerprints to determine 2D video copies.

US2010/0318759 discloses a distributed backup storage which supports differential compression. It does not provide a distributed index for performing fast nearest neighbour searches.

The present invention provides a method of processing video fingerprint data in a cloud infrastructure, the method comprising the steps of analysing video data, extracting features from video data to form video fingerprint data, the video fingerprint data taking the form of multidimensional vectors, computing meta data and data points from the multidimensional vectors, inputting the multidimensional vector data into a distributed index having multiple levels, the distributed index comprising a directing tree and leaf nodes, storing meta data relating to the multidimensional vectors in the directing tree, storing data points computed from the multidimensional vectors in the leaf nodes, scaling the distributed index by increasing or decreasing the number of leaf nodes in the distributed index size dependent upon the number of multidimensional vectors to be stored, and distributing the leaf nodes across one or more client system.

Preferably, the multidimensional vectors are extracted from the leaf nodes and compared against multidimensional vectors extracted from another video stream.

Conveniently, all of the distributed index is hosted on a remote system.

Alternatively, only the leaf nodes are hosted on a remote system or systems.

Advantageously, the number of levels (L) to be included in the distributed index is determined by calculating the variance of the values to be stored in the distributed index.

Preferably, there are 2^L leaf nodes in the distributed index.

Conveniently, the method further includes the step of calculating the median value of the stored data points and using them as the split values at each level of the distributed index, dividing the data into two sub-sets.

Advantageously, the two sub-sets are a left sub-set and a right sub-set.

Conveniently, the median value process is repeated recursively.

Preferably, the method further includes the step of searching for the nearest neighbour of a data point.

Conveniently, the step of searching for a nearest neighbour of a data point includes traversing the directing tree.

Alternatively, the step of searching for a nearest neighbour of a data point includes the step of inserting the root of the directing tree into a priority queue.

Advantageously, the number of leaf nodes present in the distributed index is scaled by increasing the number of levels in the distributed index.

Preferably, when the number of levels is incremented by one, the number of leaf nodes available is doubled.

Conveniently, the method further includes the step of calculating the median value of the data points to be stored.

Advantageously, the method further includes the step of processing the multidimensional vectors with a map reduce algorithm.

The present invention also provides a system for processing video fingerprint data in a cloud infrastructure, system having a video fingerprint processor and a distributed index, wherein the video fingerprint processor is configured to extract features from video data to create multidimensional vectors, meta data and data points are computed from the multidimensional vectors, the distributed index has multiple levels and is formed of a directing tree and at least one leaf node, the directing tree is configured to store the meta data which relates to the multidimensional vectors, the or each leaf node is configured to store the data points computed from the multidimensional vectors, the distributed index is scalable and may be increased or decreased in size dependent upon the number of multidimensional vectors to be stored, and the or each leaf node is stored on a client system.

Preferably, the multidimensional vectors are extracted from the or each leaf node and are compared against multidimensional vectors extracted from another video stream, to detect similarities in the video streams.

Conveniently, all of the distributed index is hosted on a remote system.

Alternatively, the or each leaf node is hosted on a remote system.

Advantageously, the number of levels (L) to be included in the distributed index is determined by calculating the variance of the values to be stored in the distributed index.

Preferably, there are 2^L leaf nodes in the distributed index.

Conveniently, the distributed index is configured to calculate the median value of the stored data points and to use them as the split values at each level of the distributed index, to divide the data into two sub-sets.

Advantageously, the two sub-sets are a left sub-set and a right sub-set.

Preferably, the distributed index is configured to repeat the median value calculation recursively.

Conveniently, the distributed index is further configured to search for the nearest neighbour of a data point.

Advantageously, the search for the nearest neighbour of a data point includes traversal of the distributed index.

Alternatively, the search for the nearest neighbour of a data point includes inserting the root of the directing tree into a priority queue.

Preferably, the number of leaf nodes in the distributed index is scaled by increasing the number of levels in the distributed index.

Conveniently, when the number of levels is increased by one, the number of leaf nodes in the system is doubled.

Advantageously, when the number of levels in the distributed index is increased, the distributed index calculates the median value of the data points to be stored.

Preferably, the distributed index processes the multidimensional vectors with a map reduce algorithm.

In order that the present invention may be more readily understood, embodiments of the present invention are described by way of example only, with reference to the accompanying figures, in which.

Content-based video applications, such as copy detection and video search, require processing of large-scale and high dimensional data points. These data points represent many features extracted from videos. Given the substantial number of videos made available online and the increasing visual richness and complexities of online video content, the processing of such large volumes of data points presents a substantial challenge.

In an attempt to meet this challenge, embodiments of the invention present a distributed method to store and look up large-scale and high-dimensional data points extracted from online (and offline) video content.

In embodiments of the invention, features are extracted from videos and fingerprints (or signatures) are computed from these features. These fingerprints are stored in a distributed index, the fingerprints matched against known or catalogued videos or parts of videos. The index is distributed across computing resources in a cloud computing environment. The distributed index is then used to compare given query fingerprints against the fingerprints stored in the index for potential match.

Present technology may be employed to extract features from videos and compute fingerprints from videos or parts of videos. Such technology is conventional but innovative technologies can also be used to achieve a similar result. Examples of such methods are given in previous applications which disclose computing signatures from depth signals and from visual features of videos. However, it is to be understood that any method may be used to compute these fingerprints. The result of any fingerprint computation method is, in general, a set of multidimensional vectors. These multidimensional vectors are the input to the distributed index.

Embodiments of the present invention are concerned with creating, building and maintaining an index across a cloud computing environment.

From a high-level perspective, the distributed index according to the present invention takes two parts:
  a directing tree, which contains no data points per se, but contains meta data computed from different dimensions of data points; and
  leaf nodes, which contain actual data points, which are apportioned to respective leaf nodes in a predetermined manner so that each leaf node contains data points that are relatively close to the other data points in that leaf node as compared to the data points in other leaf nodes.

The directing tree may be used to find the leaf node that has the closest data points to a given query point. By construction (as detailed later), the directing tree may be balanced, which means that each branch has roughly the same number of nodes.

Leaf nodes may be mapped and stored in files in a distributed file system. Each node may be stored in a separate file. A file corresponding to a leaf node may be read in memory only if it needs to be either updated (i.e., inserting or deleting data points in them) or its items are the closest to a given query data point. Leaf nodes can be handled by different computing nodes in the cloud computing environment at the same time. The entire directing tree may be compact and may be maintained by a single server. The entire directing tree may be maintained in memory for fast processing. In contrast, the leaf nodes may be stored in the distributed file system.

Duplicated servers may be used to mitigate failures of the server maintaining the index as well as to process multiple query lookup operations in parallel. The number of levels in the directing tree, and hence the number of leaf nodes, may be used to control the scale of the data points stored in the index. Embodiments of the invention thus achieve scalability and robustness against failures.

The distributed index may be created from a set of data points. The index can be updated by adding new points or removing existing points. The index may be used to check whether given query points have similar ones in the index. The index may also perform distributed nearest neighbour searches to find the closest neighbours for each given query point.

The index may then return a result for each given query point of up to K nearest neighbours with a matching score for each neighbour. The query lookup process may be implemented in a distributed manner using the known MapReduce programming model which is discussed below. Operations to create and update the index are, in general, performed infrequently on a single server.

Embodiments of the invention use create and maintain a distributed implementation of an index using the MapReduce programming model disclosed in J. Dean and S. Ghemawat, MapReduce: Simplified Data Processing on Large Clusters, *Communications of the ACM*, vol 51, no 1, pp. 107-113, 2008. Embodiments of the invention do not improve the MapReduce model disclosed in Dean and Ghemawat, but do utilise the MapReduce model in their implementation.

MapReduce is a programming model designed for processing large volumes of data in parallel by dividing the work into a set of independent tasks. MapReduce programs are, in general, written in a particular style influenced by functional programming constructs, specifically idioms for processing lists of data.

MapReduce functionality is used in the implementation of embodiments of the present invention.

Figure 1:
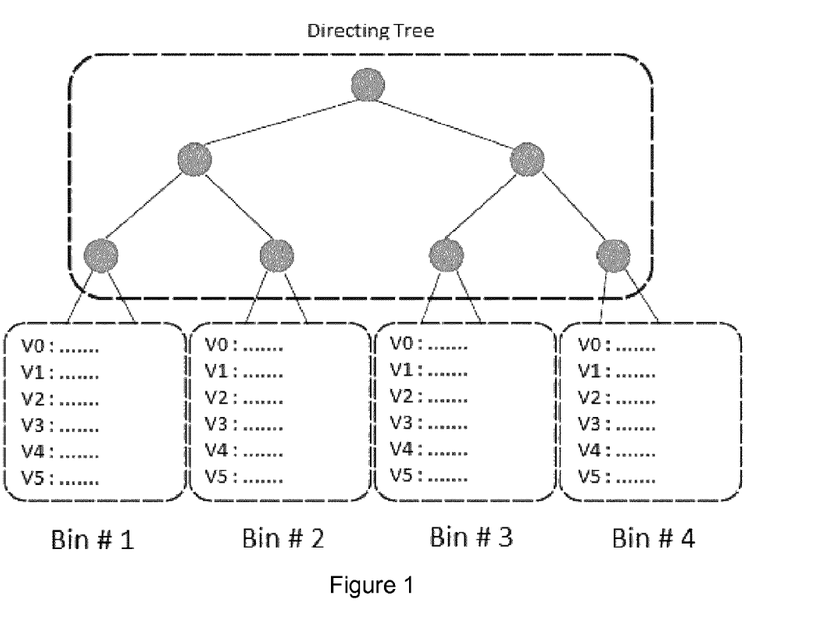
FIG. 1 shows an overview of the mapping function according to the present invention.

The first phase of a MapReduce program is mapping. A list of data elements are provided, one at a time, to a mapper function, which transforms each element individually to an output data element, as shown in FIG. 1.

Figure 2:
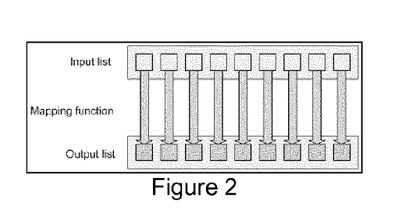
FIG. 2 shows an overview of the reducing function according to the present invention.

The second phase of a MapReduce program is reducing, which allows values to be aggregated together. A reducer function receives an iterator of input values from an input list, and then combines these values together, returning output value results, as shown in FIG. 2.

Figure 3:
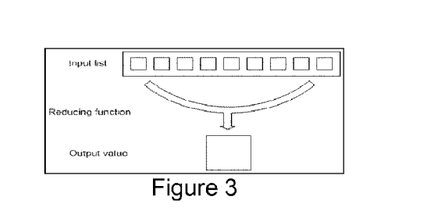
FIG. 3 shows key processing steps according to the present invention.
Figure 4:
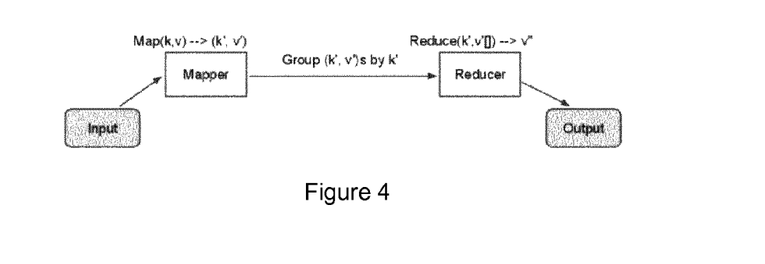
FIG. 4 shows distributed job handling according to the present invention.

MapReduce is particularly suitable for data intensive processing in which the input data can be too large for a single computer to process in a reasonable amount of time. Instead, the data is broken into chunks and processed by a plurality (potentially a large number) of different computers. The map function takes a key-value input and produces a key-value intermediate output. These data are stored on the local disk in a location which is tracked by a master node. The reduce function takes the intermediate values through remote file access and combines the results of matching keys. These results are written onto the DFS (Distributed File System). FIG. 3 demonstrates the key value processing steps and FIG. 4 shows the distributed job handling process between nodes.

Figure 5:
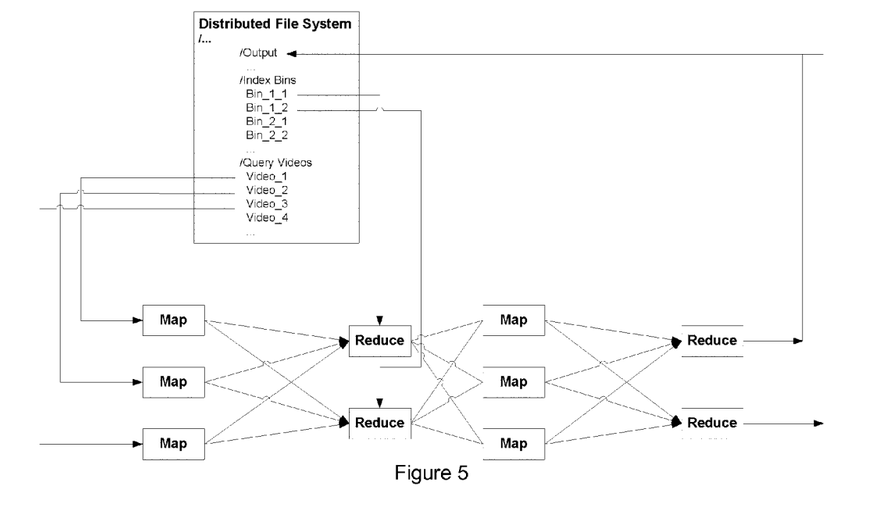
FIG. 5 shows an overview of the distributed index according to the present invention.

The Apache Hadoop software library is a framework that allows for the distributed processing of large data sets across clusters of computers using the MapReduce programming model. It is designed to scale up from single servers to thousands of machines, each offering local computation and storage. Rather than relying on hardware to deliver high-availability, the library itself is designed to detect and handle failures at the application layer, so delivering a highly-available service on top of a cluster of computers, each of which may be prone to failures. The Hadoop software library also Includes Hadoop Distributed File System, or 'HDFS', is a distributed file system that provides high throughput access to application data. An example of a distributed file system is shown in FIG. 5.

In the present invention, Hadoop may be used as an implementation and framework for the development and deployment of the MapReduce functionality.

Amazon Web Services (or 'AWS') is a collection of remote computing services that together make up a cloud computing platform, offered over the Internet by Amazon. Three services offered by AWS are:

Amazon Simple Storage Service ('S3'), which provides scalable online storage;

Amazon Elastic Cloud Compute ('EC2'), which provides scalable online virtual computing power; and Amazon Elastic Map Reduce ('EMR'), which provides a hosted Hadoop framework running on Amazon EC2 and S3 services.

The steps undertaken in creating and updating the index, along with the distributed look up operations are discussed below.

As mentioned previously, the distributed index may be composed of a directing tree and leaf nodes. The directing tree may be based on a modified version of K-dimensional (KD) trees. Embodiments of the invention, comprising a distributed index mechanism, improve on the prior art trees, with the improvements including storing data points in the leaf nodes and dynamically using a subset of the dimensions of the data points. The index embodying the present invention may be distributed and may run on clusters with variable numbers of machines.

A KD-tree is a binary tree in which every node is a K-dimensional point. Every non-leaf node may be considered as implicitly generating a splitting hyper-plane that divides the space into two parts, known as subspaces. Points to the left of this hyper-plane represent the left sub-tree of that node and points right of the hyper-plane are represented by the right sub-tree. The hyper-plane direction is chosen such that every node in the tree is associated with one of the k-dimensions, with the hyper-plane perpendicular to the axis of the k-dimension.

The present invention modifies traditional KD trees to design a distributed index. This is achieved by data points not being stored in non-leaf nodes, which achieves substantial memory saving. All data points are stored in leaf nodes. Further, map leaf nodes files are mapped and stored on a distributed file system, which enables distributed processing of look-up queries.

Additionally, only a subset of the dimensions of the data points is used, as opposed to all dimensions. This is because traditional KD tree structures perform poorly for high dimensional data sets. Video processing applications are required to process high dimensional data sets. Also, the index is increased and decreased in size dynamically, based on the number of data points. This is achieved by controlling the number of dimensions used in the index. This dynamic feature allows us efficiently support video processing applications with different scales.

Embodiments of the present invention include a distributed implementation of the index using the MapReduce programming model disclosed in Dean and Ghemawat which achieves scalability and robustness against failures.

To increase the efficiency and accuracy of the index, a subset of the dimensions are used to construct the index. The number of dimensions in each data point is denoted as D. Then, $M \leq D$ is taken as the dimensions used in the tree.

To select M, if the data set is large, a random representative sample of it may be taken. Otherwise, the whole data set may be used. Then, for each dimension of the data points, the variance of its values may be calculated.

Once the variance is calculated, the dimensions may be ranked in descending order based on their variances, and the first M dimensions may be taken which have the highest variances.

It is to be understood that several other methods may be used to select dimensions. For example, statistical parameters other than the variance can be used. Also, principal component analysis ('PCA') can be used to identify important components of the data set and employ these important components in building the index.

L may be used to denote the number of levels in the tree. Whilst M is fixed, L may change as the number of data points changes. L is also used to control the size of the index, as L controls the number of levels in the index. If L becomes larger than the number of chosen dimensions M, some dimensions may be repeated multiple times to reach the number of desired tree levels.

After choosing the number of levels (L), the index may be created. Firstly, the maximum depth (number of levels) of the index is set to L. Thus, the tree may have $2^L$ (2^L) leaf nodes. Then, at each level of the index (starting from the top level), the data points may be sorted with respect to the dimension corresponding to that level.

Figure 6:
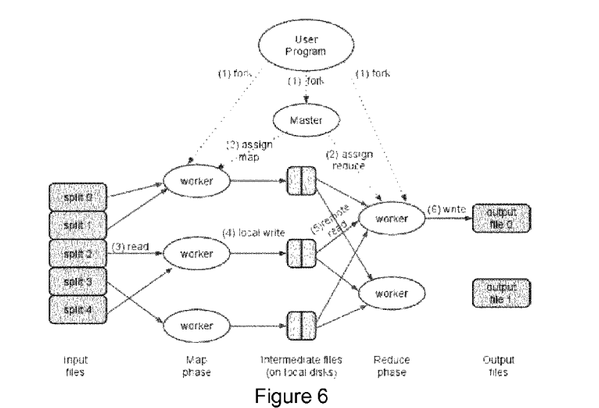
FIG. 6 shows distributed job handling between distributed nodes according to the present invention.

Next, the median values of the sorted data points are used as the split values at each level and are stored in the interior nodes of the index. Subsequently, the data set is divided to left and right sub-sets based on the split values, and the left sub-set is inserted on the left sub-tree, and the right sub-set on the right sub-tree. This procedure may then be recursively repeated until the leaf node is reached, with the actual data points stored in leaf nodes. FIG. 6 shows an overview of the job handling according to the present invention.

An example of high level code for an index construction process is given below.

```
points [ ]
constructIndex (curIndexNode, start, end, curDimInd)
{
  if (curDimInd is the last dimension)
    set curIndexNode to be a leaf node
  else
  {
  sort (points, start, end )
     median = ( start + end ) / 2
     curIndexNode->splitValue = points[median] [curDimInd]
     constructIndex (curIndexNode->left, start, median,
        curDimInd+1)
     constructIndex (curIndexNode->right, median+1, end,
        curDimInd+1)
  }
}
```

When a query data point is given, the nearest neighbours for the point may then be found. To achieve this, the directing tree is traversed until the leaf node is reached, containing data points. Then, the closest neighbours to the given point in the file corresponding to the found leaf node may be found. This finding neighbour operation may be carried out in parallel for many points at the same time. The details of the distributed version are set out in a later section of this document.

An example of high-level code for a find neighbour operation is given below.

```
getLeafNodeID (KDtreeNode, features)
{
  if (KDtreeNode is leaf node)
    return KDtreeNode -> fileID
  else if (features[currentDimension] <= KDtreeNode ->
splitValue)
    return getLeafNodeID (KDtreeNode -> left, features);
  else
    return getLeafNodeID (KDtreeNode -> right, features);
}
```

An alternative method to find neighbours is given below. This method may find more and closer neighbours by searching in multiple leaf nodes or 'bins'. The multiple bins may be chosen such that they contain the potential nearest neighbours. This method may require more processing power, but, in general, yields better neighbours, and may search candidate bins in ascending order of their distances to a given query point. It may maintain a priority queue of nodes, where the priority of a node is inversely proportional to its distance to the query point and the rectangle corresponding to this node.

The steps of this neighbor find method may include inserting the root of the KD tree into a priority queue, and then repeating the following steps:
Get the top node from the queue with the highest priority;
If it is a leaf node, or 'bin', add it to a list of preferred bins;
If not, calculate the distance from the query point to its child nodes, and insert them into the priority queue; and
Terminate the algorithm if the maximum number of bins is reached or the priority queue is empty.

An example of high-level code for this find neighbour method is shown below.

```
List ResultBins = [ ]
PriorityQueue q
TreeNode currentNode
Add tree root to q
WHILE q is not empty
currentNode = top of q
   WHILE currentNode is not Leaf
      Calculate the distance from the query
         point to the splitting dimension of the currentNode
      IF distance < 0 //closer to left node
         add the right child of currentNode to q
         currentNode = the left child of currentNode
      ELSE IF distance > 0 //closer to right node
         add left child of currentNode to q
         currentNode = right child of currentNode
   add binID of currentNode to resultBins
   IF count of resultBins = Max number Of Bins
      terminate the algorithm
```

Insert and delete operations work as in regular binary trees. An example of code for an insert operation is given below. (The initial call is addVector (root, newVector), and it is assumed that the dimensions are indexed 0, 1, . . . , DIM−1, The variable 'currentDimension' keeps track of the current cutting dimension.

```
InsertDataPoint (IndexNode, Point)
{
  if (IndexNode is leaf)
  {
     Add Point to existing points in IndexNode
  }
  else if (dimensions[currentDimension] <= IndexNode -
>splitValue)
     InsertDataPoint (IndexNode ->left, Point)
  else
     InsertDataPoint (IndexNode ->right, Point)
}
```

To delete a data point, the bin for the data point may be found using the find algorithm above. Then, the point in the file corresponding to the found bin located, the point deleted and the deleted point replaced by the last point in the file.

When the number of data points increases/decreases significantly, the index internal structured needs to be scaled up or down to handle the significant change of the data size. We design our index to be highly scalable and can adapt to the dynamic changes in number of data points. We achieve this dynamic scalability by controlling the number of levels in the index, which is determined by the number of dimensions M used from the data points. Specifically, increasing M by one, doubles the number of nodes, and vice versa.

The index may be scaled up as follows (with similar operations used to scale it down). Firstly, the new dimension to be added must be selected. This may, in general, be the dimension which has the highest variance and not included in the tree already. Then, the contents of each file associated with the leaf nodes of the index may be sorted, based upon the value of the new dimension.

Subsequently, the median value for the sorted data points may be calculated, and then each leaf node may be split into two branches, with their associated files split in two, adding a new level to the index.

When more data points are provided, the tree bins sizes increase and the files associated to them become larger resulting in a low performance search. In order to avoid such a case, the KD-tree must be scaled up.

The MapReduce model divides the input data into splits, in which the data is organized as key-value pairs. Then, it creates a number of mapper functions to process each key-value pair in the input splits. Multiple mappers can run concurrently on each node in the cluster. Ideally, a mapper is run on the same node where the input split resides. After all mappers finish, reducer functions are executed to process the outcome of the mappers. Each reducer handles a fraction of the output key space, and produces the final results. Multiple stages of mapper and reducers can be chained together.

The aim of the present invention is to provide efficient and reliable processing of large-scale data sets. The most frequently invoked function on the distributed index is finding nearest neighbours for given query points. This is the function that the index is optimised to perform. Other functions, such as construction and updating the index, are, in general, undertaken infrequently over long periods. Thus, they are considered more offline functions and can be performed on duplicated copies of the index on backup machines. Once these infrequent functions are performed, the new index is copied over to the main index servers.

The MapReduce function is divided into two main map reducing stages. The first stage is provided with a set of query points and the function calculates the K nearest neighbours for each query point. The second stage depends on the specific application that uses the distributed index. For example, in the video copy detection application, the second stage constructs similarity matrices between query videos and reference videos to find potentially copied videos.

High-level code for the first map-reduce stage of our design is set out below, which consists of one Mapping task followed by two Reducing tasks. The second stage depends on the specific application using the index.

```
Map (Key, Value)
{
    // Input: file with query points
    // Output: Nearest Bins IDs for each query point
    // Task: find leaf nodes that have neighbors of query
    //    points, emit pairs of <LeafNodeID, query point>
    For each query point q
    {
        Query the tree get nearest bins for q
        Foreach (bin in the nearest bins)
        {
```

-continued

```
            Emit(binId, query vector)
        }
    }
}
/*** First Reducer ***/
Reduce (Key, Value)
{
    // Input: key is a LeafNodeID, and Value is the list of
    //    query points having neighbors in file corresponding
    //    to LeafNodeID
    // Output: pairs of <q, list of k neighbors> for each
    //    query point from that specific leaf node
    // Task: calculate the nearest neighbors for each query
    //    point
    Load the bucket from the disk
    Initialize map from BucketID to corresponding query
        vectors
    Initialize neighbor list to fill the nearest m frame
        matches to the query vectors
    Foreach (Query Vector in Query Vectors List)
    {
        Foreach (Reference vector in the bucket)
        {
            Initialize refVectorID
            Initialize qVectorID
            Calculate the distance between current query
                vector the current reference vector
            If (distance is larger than current threshold)
            {
                Initialize framematch instance (fm) with
                    current refVectorID,qVectorID,distance
                neighbors.add(fm)
            }
        }
    Sort neighbors with respect to distance
    Pick the nearest m frame matches
    Foreach nearest frame match f
    {
        Emit (qVideoID, f)
    }
}
/*** Second Reducer ***/
Reduce (Key, Value)
{
    // Input: key is a LeafNodeID, and Value is the list of
    //    query points identified as having neighbors in file
    //    corresponding to LeafNodeID
    // Output: pairs of <q, list of k neighbors> for each
    //    query point from all bins
    // Task: Get the nearest K matches for each query video
    //    against all the nearest bins, and sort them.
    Sort the input framematch list on the distance
    // now we have all frame matches from all nearest bins
    Pick the nearest m framematches.
    Foreach nearest frame match f
    {
        Emit ([refVideoID,qVideoID], f)
    }
}
```

A novel method to design, implement and create distributed indexes for storing and comparing fingerprints of videos is presented. The method effectively utilises cloud computing platforms that offer varying amounts of computing resources. The method enables the distributed index to scale to large numbers of data points and the distributed index is robust to failures within the computing resources maintaining the index. The method minimizes the memory required to maintain the distributed index and reduces the I/O operations needed to process operations performed on the index. The method improves the efficiency of the index to process queries.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of processing video fingerprint data in a cloud infrastructure, the method comprising:
   analysing video data;
   extracting features from the video data to form the video fingerprint data, the video fingerprint data taking the form of multidimensional vectors;
   computing meta data and data points from the multidimensional vectors;
   inputting the meta data and the data points from the multidimensional vectors into a distributed index having multiple levels, the distributed index comprising a directing tree and leaf nodes;
   storing the meta data relating to the multidimensional vectors in the directing tree;
   storing the data points computed from the multidimensional vectors in the leaf nodes;
   scaling the distributed index by increasing or decreasing a number of the leaf nodes in the distributed index size depending upon a number of the multidimensional vectors to be stored;
   distributing the leaf nodes across at least one client system;
   searching for a nearest neighbour of a data point;
   inserting a root node of the directing tree into a priority queue;
   determining a closest distance node from the priority queue to a query node;
   if the closest distance node is a leaf node or a bin, adding the closest distance node to a list of preferred bins;
   if the closest distance node is not a leaf node or a bin, determining a distance from the query node to a child node wherein the child node is a child of the closest distance node and adding the child node to the priority queue; and
   terminating if a maximum number of bins is reached or the priority queue is empty,
   wherein the directing tree contains no data points but contains the meta data computed from the multidimensional vectors; and
   the leaf nodes contain data points which are apportioned to each respective leaf node in a predetermined manner so that each of the leaf nodes contains data points that are relatively close to other data points in the same leaf node as compared to the data points in other leaf nodes.

2. The method of claim 1 further comprising: determining potential bins of the bins to perform the nearest neighbour search.

3. The method of claim 1 further comprising: maintaining a priority queue of nodes.

4. The method of claim 1 wherein the multidimensional vectors are extracted from the leaf nodes and compared against multidimensional vectors extracted from another video stream.

5. The method of claim 1 wherein the entirety of the distributed index is hosted on a remote system.

6. The method of claim 1 wherein only the leaf nodes are hosted on a remote system or systems.

7. The method of claim 1 further including determining a number of the levels (L) to be included in the distributed index by calculating a variance of the values to be stored in the distributed index.

8. The method of claim 7 wherein there are $2^L$ leaf nodes in the distributed index.

9. The method of claim 1 further including calculating a median value of the stored data points, and using them as split values at each level of the distributed index, dividing the data into two sub-sets.

10. The method of claim 9 wherein the two sub-sets are a left sub-set and a right sub-set.

11. The method of claim 10 wherein the median value process is repeated recursively.

12. The method of claim 1 wherein the searching for the nearest neighbor of the data point includes traversing the directing tree.

13. The method of claim 1 wherein the number of the leaf nodes present in the distributed index is scaled by increasing a number of the levels in the distributed index.

14. The method of claim 13 wherein when the number of the levels is incremented by one, the number of the leaf nodes available is doubled.

15. The method of claim 13 further including calculating a median value of the data points to be stored.

16. The method of claim 1 further including processing the multidimensional vectors with a map reduce algorithm.

17. The method of claim 1 further comprising repeating the determining a closest distance node from the priority queue to a query node; the adding the closest distance node to a list of preferred bins if the closest distance node is a leaf node or a bin; the determining a distance from the query node to a child node wherein the child node is a child of the closest distance node and adding the child node to the priority queue if the closest distance node is not a leaf node or a bin; and the terminating if a maximum number of bins is reached or the priority queue is empty.

18. A system for processing video fingerprint data in a cloud infrastructure, the system having a video fingerprint processor and a distributed index, wherein:
   the video fingerprint processor is configured to extract features from video data to create multidimensional vectors;
   meta data and data points are computed from the multidimensional vectors;
   the distributed index has multiple levels and is formed of a directing tree and at least one leaf node;
   the directing tree is configured to store the meta data which relates to the multidimensional vectors;
   the at least one leaf node is configured to store the data points computed from the multidimensional vectors;
   the distributed index is scalable and is adapted to be increased or decreased in size dependent upon a number of the multidimensional vectors to be stored;
   the at least one leaf node is stored on a client system,
   the distributed index is configured to search for a nearest neighbour of a data point in the multiple leaf nodes;
   the search for the nearest neighbour of the data point includes inserting a root of the directing tree into a priority queue;
   the distributed index is configured to determine a closest distance node from the priority queue to a query node;
   if the closest distance node is one of the multiple leaf nodes, the distributed index is configured to add the closest distance node to a list of preferred bins;
   if the closest distance node is not one of the multiple leaf nodes, the distributed index is configured to determine a distance from the query node to a child node wherein the child node is a child of the closest distance node and add the child node to the priority queue; and the distributed index is configured to terminate if a maximum number of bins is reached or the priority queue is empty, wherein the directing tree contains no data points but contains the meta data computed from the multidimensional vectors; and the leaf nodes contain data points which are apportioned to each respective leaf node in a predetermined manner so that each of the leaf node contains data points that are relatively close to other data points in the same leaf node as compared to the data points in other leaf nodes.

19. The system of claim 18 wherein the multidimensional vectors are extracted from the at least one leaf node and are compared against multidimensional vectors extracted from another video stream, to detect similarities in the video streams.

20. The system of claim 18 wherein the entirety of the distributed index is hosted on a remote system.

21. The system of claim 18 wherein the at least one leaf node is hosted on a remote system.

22. The system of claim 18 wherein a number of the levels (L) to be included in the distributed index is determined by calculating a variance of the values to be stored in the distributed index.

23. The system of claim 22 wherein there are $2^L$ leaf nodes in the distributed index.

24. The system of claim 18 wherein the distributed index is configured to calculate a median value of the stored data points and to use them as split values at each level of the distributed index, to divide the data into two sub-sets.

25. The system of claim 24 wherein the two sub-sets are a left sub-set and a right sub-set.

26. The system of claim 25 wherein the distributed index is configured to repeat the median value calculation recursively.

27. The system of claim 18 wherein the search for the nearest neighbor of the data point includes traversal of the distributed index.

28. The system of claim 18 wherein a number of the leaf nodes in the distributed index is scaled by increasing a number of the levels in the distributed index.

29. The system of claim 28 wherein when the number of the levels is increased by one, the number of the leaf nodes in the system is doubled.

30. The system of claim 28 wherein when the number of the levels in the distributed index is increased, the distributed index calculates a median value of the data points to be stored.

31. The system of claim 18 wherein the distributed index processes the multidimensional vectors with a map reduce algorithm.

32. The system of claim 18 wherein the distributed index is further configured to repeat the determining a closest distance node from the priority queue to a query node; the adding the closest distance node to a list of preferred bins if the closest distance node is a leaf node or a bin; the determining a distance from the query node to a child node wherein the child node is a child of the closest distance node and adding the child node to the priority queue if the closest distance node is not a leaf node or a bin; and the terminating if a maximum number of bins is reached or the priority queue is empty.

* * * * *